US012497834B2

(12) United States Patent
Heider et al.

(10) Patent No.: US 12,497,834 B2
(45) Date of Patent: Dec. 16, 2025

(54) ROPE LADDER WITH TWO BRAIDED ROPES

(71) Applicant: AIRBUS HELICOPTERS DEUTSCHLAND GMBH, Donauworth (DE)

(72) Inventors: Christoph Heider, Rain Am Lech (DE); Dominik Vogel, Langweid (DE); Stefan Salzburger, Augsburg (DE); Alexandru Dinca, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 1011 days.

(21) Appl. No.: 17/574,176

(22) Filed: Jan. 12, 2022

(65) Prior Publication Data

US 2023/0011780 A1 Jan. 12, 2023

(30) Foreign Application Priority Data

Jul. 7, 2021 (EP) .................................... 21400015

(51) Int. Cl.
*E06C 1/56* (2006.01)

(52) U.S. Cl.
CPC .................................... *E06C 1/56* (2013.01)

(58) Field of Classification Search
CPC .................................................... E06C 1/56
USPC ...................................................... 182/196
See application file for complete search history.

(56) References Cited

U.S. PATENT DOCUMENTS

| | | | | |
|---|---|---|---|---|
| 271,796 A * | 2/1883 | Converse | E06C 1/56 182/198 |
| 3,077,241 A | 2/1963 | Klages | |
| 3,078,954 A * | 2/1963 | Macleod | E06C 1/56 182/228.6 |
| 3,128,843 A * | 4/1964 | Anagnostou | E06C 1/56 182/198 |
| 3,415,341 A | 12/1968 | Hostetler | |

(Continued)

FOREIGN PATENT DOCUMENTS

| | | |
|---|---|---|
| GB | 217766 A | 6/1924 |
| GB | 1285334 A | 8/1972 |
| GB | 2367585 A | 4/2002 |

(Continued)

OTHER PUBLICATIONS

European Search Report for European Application No. EP 21400015.0 Completed by the European Patent Office, Dated Dec. 10, 2021, 5 pages.

*Primary Examiner* — Christopher Garft
(74) *Attorney, Agent, or Firm* — BROOKS KUSHMAN P.C.

(57) ABSTRACT

A rope ladder comprising: a first ladder step connecting element that is mounted to a first braided rope, a second ladder step connecting element that is mounted to a second braided rope, and a ladder step that couples the first ladder step connecting element with the second ladder step connecting element; wherein the first ladder step connecting element is braided into the first braided rope and the second ladder step connecting element is braided into the second braided rope, and wherein the ladder step fixes the first ladder step connecting element in the first braided rope and the second ladder step connecting element in the second braided rope.

20 Claims, 7 Drawing Sheets

(56) References Cited

U.S. PATENT DOCUMENTS

| | | | | |
|---|---|---|---|---|
| 6,902,037 | B2 | 6/2005 | Salvarezza | |
| 2004/0200197 | A1* | 10/2004 | Peterson | E06C 1/525<br>54/44.1 |

FOREIGN PATENT DOCUMENTS

| | | | |
|---|---|---|---|
| GB | 2552204 | A | 1/2018 |
| KR | 200442694 | Y1 | 12/2008 |

* cited by examiner

ROPE LADDER WITH TWO BRAIDED ROPES

CROSS-REFERENCE TO RELATED APPLICATIONS

This application claims priority to European patent application No. EP 21400015.0 filed on Jul. 7, 2021, the disclosure of which is incorporated in its entirety by reference herein.

TECHNICAL FIELD

The present disclosure is related to a rope ladder with a first braided rope, a second braided rope, and a plurality of ladder steps.

BACKGROUND

Rope ladders are widely used in civil, parapublic and military missions. For instance, rope ladders may be used with a rotary wing aircraft, in particular a helicopter, for on- and off-boarding, searching and rescuing, evacuating and extracting persons from various environments, including maritime environments such as offshore as well as oil and gas platforms, terrestrial environments such as land in vegetated areas, mountains and urban territory, or from aerial work to an inside of the helicopter with own muscular force without a need for a winch or a landing operation of the helicopter.

Various rope ladders are known from the state-of-the-art. These rope ladders vary with respect to the manner in which respective ladder steps are secured to associated ropes, but also with respect to respectively used ropes. For instance, illustrative rope ladders with simple ropes are described in the documents GB 1 285 334 A and GB 2 367 585 A. Illustrative rope ladders with twisted ropes are described in the documents GB 2 552 204 A, U.S. Pat. Nos. 3,128,843, 3,415,341, and 6,902,037 B2.

The document U.S. Pat. No. 3,077,241 A in turn describes a rope ladder with braided ropes, wherein each braided rope is formed of a plurality of braided strands. At each location, where a ladder step is attached to the braided ropes, the braided strands of each braided rope are respectively separated into two groups and an aperture is formed into which is mounted a reinforcing member or bushing. The reinforcing members or bushings in both braided ropes are then respectively used as bearings for the ladder step that is secured by means of a self-locking nut at two plug halves which are mounted to each braided rope around each reinforcing member or bushing to keep the latter in place.

However, any visual inspection of the condition of the braided ropes at the locations of the reinforcing members or bushings in the braided ropes requires a disassembling of the respective plug halves and, thus, removal of the associated ladder steps. Thus, inspection and maintenance of the rope ladder is complex and time-consuming. Documents GB217766 and KR200442694 are also known.

SUMMARY

It is, therefore, an object of the present disclosure to provide a new rope ladder with braided ropes which allows for a quick and reliable visual inspection as well as an easy and uncomplicated exchange of its constituting components.

This object is solved by a rope ladder with braided ropes that comprises the features of claim 1. More specifically, according to the present disclosure a rope ladder with a first braided rope, a second braided rope, and a plurality of ladder steps is provided. The rope ladder comprises at least one first ladder step connecting element that is mounted to the first braided rope, at least one second ladder step connecting element that is mounted to the second braided rope, and at least one associated ladder step of the plurality of ladder steps that couples the at least one first ladder step connecting element with the at least one second ladder step connecting element. The at least one first ladder step connecting element is braided into the first braided rope and the at least one second ladder step connecting element is braided into the second braided rope. The at least one associated ladder step of the plurality of ladder steps fixes the at least one first ladder step connecting element in the first braided rope and the at least one second ladder step connecting element in the second braided rope.

Advantageously, the inventive rope ladder may easily be inspected, in particular visually inspected, and repaired in case of deterioration. Furthermore, an underlying length of the rope ladder is adjustable and ladder steps may be added as required. Accordingly, the inventive rope ladder is modular and assembled from two braided ropes, a plurality of ladder step connecting elements, as well as a plurality of ladder steps. At least the ladder steps of the plurality of ladder steps and the ladder step connecting elements of the plurality of ladder step connecting elements are preferably exchangeable.

More specifically, the two braided ropes may preferably be opened, respectively pulled open, at arbitrarily selected positions along the braided ropes, without a need to fully open the braided ropes over their whole lengths. Thus, respective ladder step connecting elements may be interweaved at these arbitrarily selected positions and, subsequently, a ladder step may be inserted in each ladder step connecting element such that the ladder step connecting element is locked in the braided rope and may not be removed from the braided rope without removing the ladder step therefrom.

Preferably, each ladder step connecting element is embodied as a braiding member and, more particularly, as a braiding plate. The braiding plate may be made of a metallic material and may have a substantially annular design with smooth rounded edges.

In an illustrative realization, each braided rope comprises eight strands and, more particularly, four pairs of strands which are braided to form the braided rope. Use of eight strands, i.e., four pairs of strands, enables a redundant rope design and provision of damage tolerant braided ropes.

In this illustrative realization, an inside of each braiding plate may have six recesses, e.g., one upper, one lower, two left hand and two right hand recesses, into which the eight strands of an associated braided rope are inserted. Preferably, in the center of each braiding plate a circular opening is foreseen which has a diameter that corresponds at least to the diameter of a respective ladder step. Furthermore, each braiding plate preferably comprises through-holes on at least two diametrically opposed lateral legs. A thread may be provided in the through-hole of one of the at least two diametrically opposed lateral legs and the through-hole in the other one of the at least two diametrically opposed lateral legs may have two different diameters in order to form a bearing surface on which a head of a locking screw can rest.

Advantageously, the two braided ropes may be manufactured, i.e., braided, automatically. Furthermore, the braiding plates and respective ladder steps may be manufactured independent of each other and of the two braided ropes and attached to the two braided ropes afterwards to assemble the inventive rope ladder.

By way of example, two braided ropes may be arranged in parallel, each braided rope being braided over its entire length and consisting of eight strands, i.e., four pairs of strands. The braiding of each braided rope is preferably designed such that the strands are movable relative to one another in a not-tensioned and released condition of each braided rope, which may thus be widened respectively nondestructively opened at selected positions. A respective widening of a given braided rope enables insertion of a braiding plate laterally into the given braided rope at a selected position. After lateral insertion of the braiding plate at the selected position into the widened braided rope, preferably four strands of the braided rope are inserted through the braiding plate from its front side and the other four strands through the braiding plate from its back side. All strands are guided from the front or rear side through associated recesses such that ultimately the braiding plate is completely interweaved into all eight strands and the braiding plate is, thus, braided into the braided rope.

Preferably, this is done such that an unoccupied opening is maintained in the center of the braiding plate that has at least the diameter of a ladder step, which may thus be passed through this unoccupied opening. Accordingly, corresponding ends of the ladder step are inserted through respective openings in two braiding plates of both parallel braided ropes that are to be interconnected by the ladder step. This is performed such that the through-holes in the braiding plates and respective bores in the ladder step are aligned with one another so that the ladder step may be secured, e.g., with screws, to the braiding plates. A removal of a selected ladder step and associated braiding plates may be carried out in reverse order.

Preferably, an underlying distance between an outer surface of a ladder step that is mounted to a braiding plate and an outer contour of the at least two diametrically opposed lateral legs of the braiding plate is designed to have a width that corresponds at least to the thickness of a human finger, preferentially at least three centimeters, in order to provide a floor spacing portion between the ladder step and e.g., a helicopter floor to which the inventive rope ladder is attached. This feature guarantees enough clearance in order to allow a comfortable and safe grabbing of ladder steps when an upper area of the inventive rope ladder lies on the helicopter floor.

According to one aspect, the at least one first ladder step connecting element is embodied as a first braiding member, and the at least one second ladder step connecting element is embodied as a second braiding member.

According to one aspect, each one of the first braiding member and the second braiding member comprises a ring-shaped body with an inner opening.

According to one aspect, the inner opening exhibits at least a six-petalled Rosette shape.

According to one aspect, the inner opening is composed of a central opening with a predetermined number of radial extensions.

According to one aspect, the radial extensions of the predetermined number of radial extensions are separated from each other by associated retaining fingers which extend from the ring-shaped body radially inward toward the central opening.

According to one aspect, the associated retaining fingers comprise free ends which form bearing support surfaces that define a diameter of the central opening.

According to one aspect, the diameter of the central opening corresponds to a diameter of the at least one associated ladder step of the plurality of ladder steps.

According to one aspect, the first braided rope and the second braided rope are braided into the radial extensions of the predetermined number of radial extensions. The at least one associated ladder step of the plurality of ladder steps is mounted to the central opening such that the at least one associated ladder step blocks the first braided rope and the second braided rope in the radial extensions of the predetermined number of radial extensions.

According to one aspect, the ring-shaped body has a thickness of at least three centimeters.

According to one aspect, the first braided rope comprises a first predetermined number of strands which are braided together to form the first braided rope, wherein the at least one first ladder step connecting element is braided into the first predetermined number of strands. The second braided rope comprises a second predetermined number of strands which are braided together to form the second braided rope, wherein the at least one second ladder step connecting element is braided into the second predetermined number of strands.

According to one aspect, each one of the first braiding member and the second braiding member comprises a first plate-shaped surface and a second plate-shaped surface. A first number of strands of the first predetermined number of strands is guided on the first braiding member from the first plate-shaped surface toward the second plate-shaped surface and back to the first plate-shaped surface, and a second number of strands of the first predetermined number of strands is guided on the first braiding member from the second plate-shaped surface toward the first plate-shaped surface and back to the second plate-shaped surface. A first number of strands of the second predetermined number of strands is guided on the second braiding member from the first plate-shaped surface toward the second plate-shaped surface and back to the first plate-shaped surface, and a second number of strands of the second predetermined number of strands is guided on the second braiding member from the second plate-shaped surface toward the first plate-shaped surface and back to the second plate-shaped surface.

According to one aspect, each one of the first braided rope and the second braided rope comprises a first, a second, a third, and a fourth pair of strands that are braided together. The at least one first ladder step connecting element is braided into the first, second, third, and fourth pair of strands of the first braided rope. The at least one second ladder step connecting element is braided into the first, second, third, and fourth pair of strands of the second braided rope.

According to one aspect, each one of the first braiding member and the second braiding member comprises a first plate-shaped surface and a second plate-shaped surface. The first and second pairs of strands of the first predetermined number of strands are guided on the first braiding member from the first plate-shaped surface toward the second plate-shaped surface and back to the first plate-shaped surface, and the third and fourth pairs of strands of the first predetermined number of strands are guided on the first braiding member from the second plate-shaped surface toward the first plate-shaped surface and back to the second plate-shaped surface. The third and fourth pairs of strands of the second predetermined number of strands are guided on the second braiding member from the first plate-shaped surface toward the second plate-shaped surface and back to the first plate-shaped surface, and the third and fourth pairs of strands of the second predetermined number of strands are guided on the second braiding member from the second plate-shaped surface toward the first plate-shaped surface and back to the second plate-shaped surface.

According to one aspect, the first and second braided ropes are at least partly provided with associated spacing and protecting elements. The associated spacing and protecting elements preferably surround the first and second braided ropes.

Advantageously, the associated spacing and protecting elements are designed as exchangeable parts to allow full exchange and inspection of all parts of the inventive rope ladder. Furthermore, the associated spacing and protecting elements ensure an improved grabbing, e.g., if the inventive rope ladder is attached to and at least partly lying on a helicopter floor. Moreover, the associated spacing and protecting elements protect the inventive rope ladder and surrounding elements, such as e.g., the helicopter floor, and even provide for floatation capabilities of the inventive rope ladder.

More specifically, the associated spacing and protecting elements are preferably made of foam that is surrounded by a textile, both of which are wrapped around the braided ropes and secured thereon, e.g., by means of Velcro fasteners. The main function of the associated spacing and protecting elements is to protect the braided rope from abrasion, as well as to provide a distancing between the ladder steps and e.g., the helicopter floor in order to enable a more comfortable and safer grabbing of the ladder steps. Respective properties of the associated spacing and protecting elements, such as foam density, hardness, geometry, and surface texture, may be adapted in an application-specific manner, e.g., to enable use of the inventive rope ladder either as buoyancy or weight in fluids, abrasive protection, e.g., especially on a support edge on the helicopter floor, or adapting it to human needs, such as e.g., finger pinching protection or anti slipping means, so that the inventive rope ladder lies safely on the helicopter floor and a sideward slipping is avoided.

Preferably, the inventive ladder is equipped with rope interfaces that enable attachment of the rope ladder to one or more external attachment points. The rope interfaces may be embodied by eyelets, in particular metal eyelets, which are embedded in spliced respectively inter braided axial ends of the two braided ropes. This allows the usage of common fixation elements like hooks or ropes.

The rope interfaces may e.g., be attached to an associated attachment unit, e.g., an attachment plate, which is attachable to external components. More specifically, such an attachment plate preferably comprises an upper center hole and two upper side holes, and may be used for a one- or multiple-point attachment, e.g., on a helicopter side. Furthermore, the attachment plate may be attached on one end or on both ends of the inventive rope ladder by means of the rope interfaces. Attachment to both ends of the inventive rope ladder may advantageously enable attachment of additional equipment on one end of the rope ladder.

A one-point attachment may e.g., be used when the upper center hole of the attachment plate is e.g., attached to a winch of a helicopter, which is usually located over a side door of the helicopter by means of an associated snap hook respectively carabiner. The multi-point attachment may e.g., be used when at least the two upper side holes are attached to a floor/structure inside the helicopter by means of associated snap hooks respectively carabiners.

In summary, the inventive rope ladder has an advantageous modular design that allows full inspection and full exchange of all constituent components, as well as a simple, economic, reliable and quick method of operation, including assembling and disassembling of the inventive rope ladder. Advantageously, the inventive rope ladder fulfills the safety requirements for human external cargo according to the US-American Federal Aviation Regulations (FAR) and/or the European Certification Specifications (CS) and is, thus, readily certifiable.

BRIEF DESCRIPTION OF THE DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
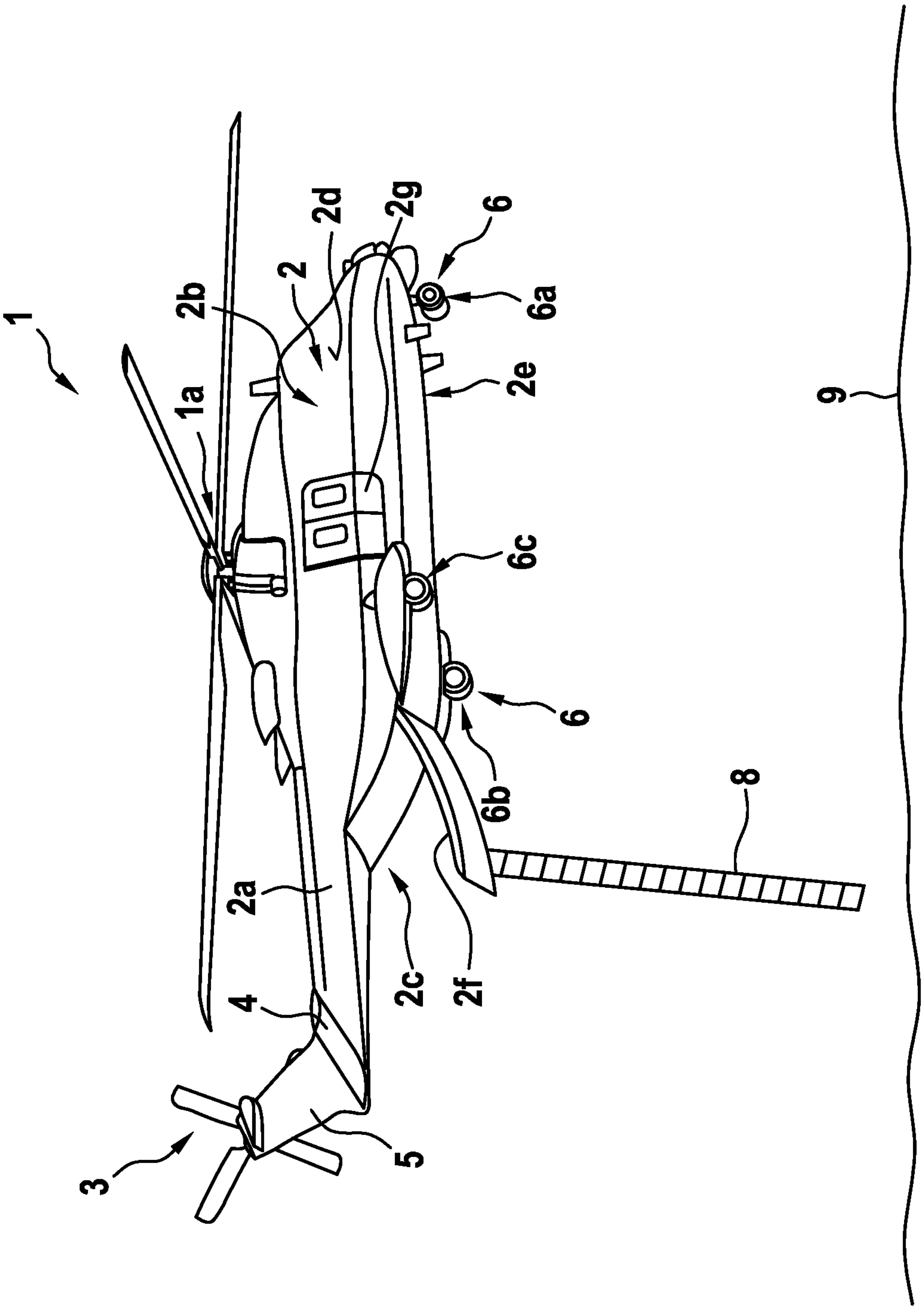
FIG. 1 shows a perspective view of a rotary wing aircraft with a rope ladder according to one aspect.

FIG. 1 shows a rotary wing aircraft 1 that illustratively comprises a fuselage 2 with a bottom shell 2*e*. The rotary wing aircraft 1 is seen in direction of a starboard side wall 2*d* of the fuselage 2, which is by way of example provided with a starboard side sliding door 2*g*.

The fuselage 2 illustratively forms a cabin 2*b* for passengers and/or cargo and comprises a tail boom 2*a*. The tail boom 2*a* is mounted to a rear side 2*c* of the fuselage 2, which is also referred to as the "rear fuselage 2*c*" hereinafter. The rear fuselage 2*c* may be provided with a rear ramp 2*f* that is e.g., pivotally mounted to the fuselage 2 at the bottom shell 2*e*.

Illustratively, the rotary wing aircraft 1 comprises a landing gear 6, which is exemplarily embodied as a wheel-type landing gear that comprises associated landing gear nose wheels 6*a*, a portside rear wheel 6*b* and a starboard side rear wheel 6*c*. The rotary wing aircraft 1 illustratively further comprises at least one main rotor 1*a* configured to provide lift and forward or backward thrust during operation, and at least one counter-torque device 3 configured to provide counter-torque during operation, i.e., to counter the torque created by rotation of the at least one main rotor 1*a* for purposes of balancing the rotary wing aircraft 1 in terms of yaw.

The at least one counter-torque device 3 is illustratively provided at an aft section of the tail boom 2*a*, which preferably further comprises a tail wing 4 and a fin 5. The tail wing 4 is preferably adjustable in its inclination and can, thus, overtake the functioning of a horizontal stabilizer. Alternatively, or in addition, the rotary wing aircraft 1 may be provided with a suitable horizontal stabilizer. However, it should be noted that the at least one counter-torque device 3, the tail wing 4 as well as the fin 5 provided at the aft section of the tail boom 2*a* are merely described for illustrating one illustrative realization of the rotary wing aircraft 1.

According to one aspect, the rotary wing aircraft 1 is provided with a rope ladder 8. By way of example, the rope ladder 8 is attached to the rear ramp 2*f*. The rope ladder 8 and/or its constituent components are further described below with reference to FIG. 2 to FIG. 11.

Illustratively, the rotary wing aircraft 1 is shown during hovering above ground 9. Thus, the rope ladder 8 may e.g., be used for rescuing, evacuating and/or extracting persons located on the ground 9.

By way of example, the rotary wing aircraft 1 is embodied as a helicopter. However, use of the rope ladder 8 is not limited to use with a helicopter. Instead, the rope ladder 8 may be used with other rotary wing aircrafts, such as e.g., tiltrotor aircrafts, compound helicopters, multicopters and so on, as well as marine vessels etc. Furthermore, the rope ladder 8 may be used completely independent of the rotary wing aircraft 1.

Figure 2:
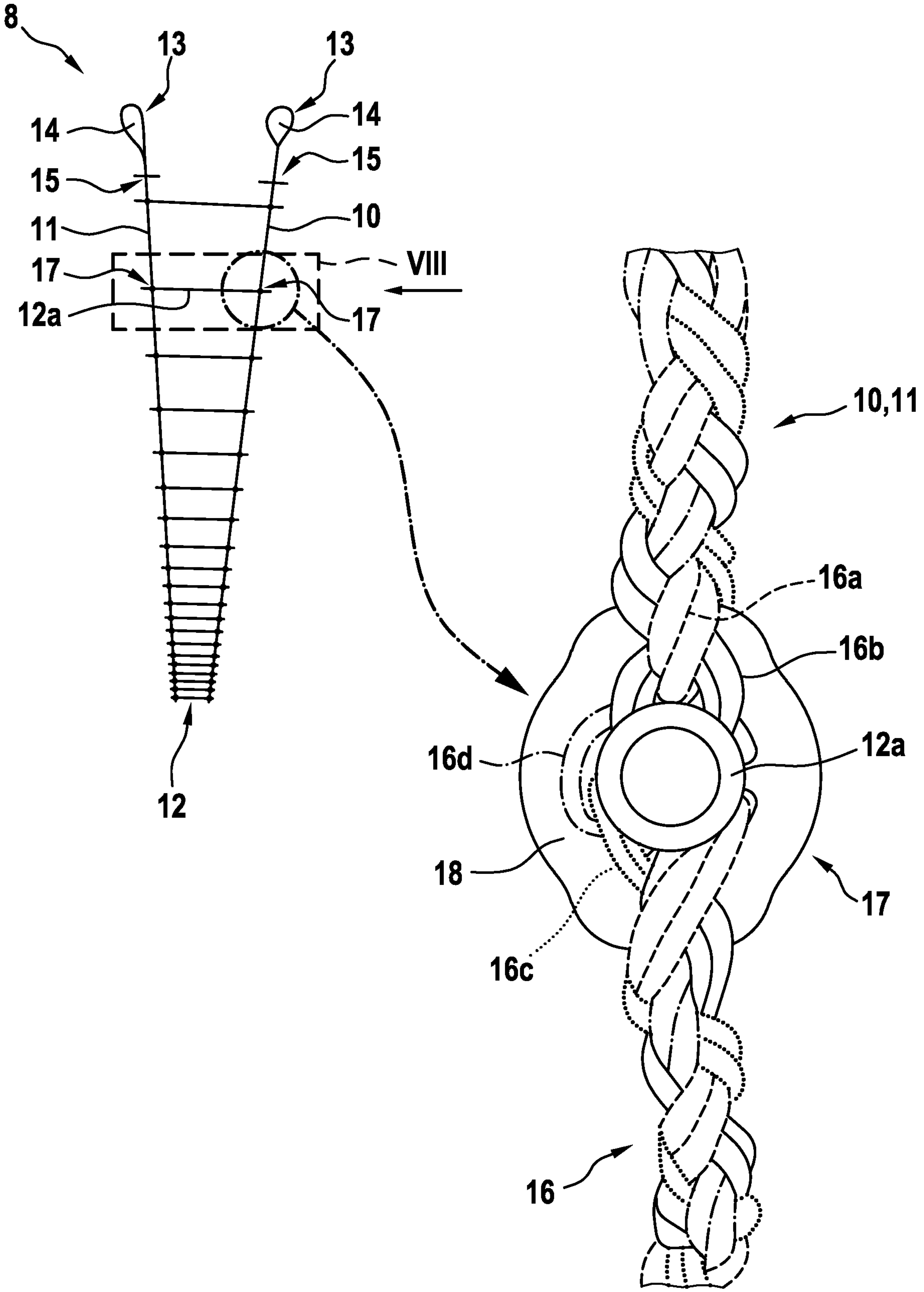
FIG. 2 shows a perspective view of the rope ladder of FIG. 1 with an enlarged detail of a ladder step connecting area.

FIG. 2 shows the rope ladder 8 of FIG. 1 and an enlarged detail thereof. According to one aspect, the rope ladder 8 comprises a first braided rope 10, a second braided rope 11, and a plurality of ladder steps 12. By way of example, and for simplicity and clarity of the drawing, only one of the plurality of ladder steps 12 is individually labelled with the reference sign 12*a*.

In an illustrative realization, at least one of the braided ropes 10, 11 is provided on at least one of its axial ends with a rope interface 13. Illustratively, both braided ropes 10, 11 are provided on their—in FIG. 2 upper—axial ends with a respective rope interface 13. Each rope interface 13 is preferably embodied by an eyelet 14, in particular a metal eyelet, which is embedded in a spliced respectively inter braided area 15 formed at the axial end of the braided rope 10, 11.

According to one aspect, each braided rope 10, 11 comprises a predetermined number of strands 16 which are braided together to form the braided ropes 10, 11. By way of example, the predetermined number may be eight. Illustratively, each one of the braided ropes 10, 11 comprises a first, a second, a third, and a fourth pair of strands 16*a*, 16*b*, 16*c*, 16*d* that are braided together.

Preferably, each braided rope 10, 11 is provided with at least one and, preferentially, with a plurality of ladder step connecting elements. All ladder step connecting elements are preferably identical within predetermined manufacturing tolerances.

Pairs of ladder step connecting elements that are each associated with a respective ladder step are braided into the braided rope 10 and the braided rope 11 and preferably oppose each other in the rope ladder 8 and are coupled to each other by the respective ladder step. Illustratively, one ladder step connecting element in the braided rope 10 is labelled with the reference sign 17 and an opposed ladder step connecting element in the braided rope 11 is likewise labelled with the reference sign 17. These two ladder step connecting elements 17 are illustratively coupled to each other via the ladder step 12*a*. The ladder step 12*a* preferably fixes the ladder step connecting elements 17 in the braided ropes 10, 11.

Illustratively, the ladder step connecting element 17 of the braided rope 10 is braided into the predetermined number of strands 16 of the braided rope 10, i.e., by way of example into the first, second, third, and fourth pair of strands 16*a*, 16*b*, 16*c*, 16*d* of the braided rope 10. Similarly, the ladder step connecting element 17 of the braided rope 11 is braided into the predetermined number of strands 16 of the braided rope 11, i.e., by way of example into the first, second, third, and fourth pair of strands 16*a*, 16*b*, 16*c*, 16*d* of the braided rope 11.

According to one aspect, at least one and, preferably, each one of the ladder step connecting elements 17 is embodied as a braiding member 18. Illustratively, the braiding member 18 is formed as a braiding plate.

It should be noted that the ladder step connecting elements are collectively referred to with the reference sign 17, as all ladder step connecting elements are preferably identical within predetermined manufacturing tolerances. Therefore, only one of the ladder step connecting elements 17 is representatively described in more detail hereinafter with reference to FIG. 3 to FIG. 5. Similarly, only braiding of this ladder step connecting element 17 into either one of the braided ropes 10, 11 is representatively described below with reference to FIG. 6 and FIG. 7.

Figure 3:
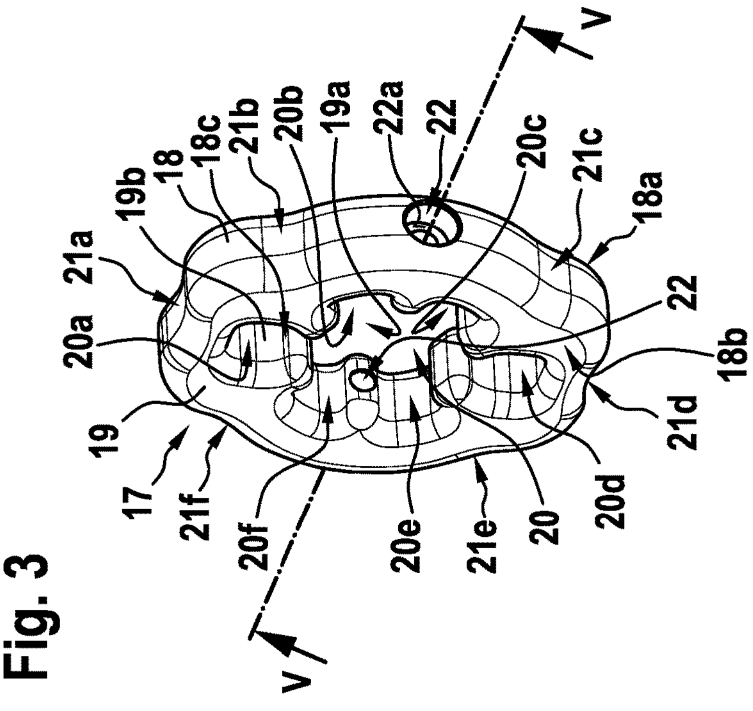
FIG. 3 shows a perspective view of a ladder step connecting element of FIG. 2.

FIG. 3 shows the ladder step connecting element 17 of FIG. 2. By way of example, the ladder step connecting element 17 is embodied as the braiding member 18 of FIG. 2, which illustratively comprises a plate-shaped front surface 18*a*, a plate-shaped rear surface 18*b*, and an inner braiding area 18*c*. In FIG. 3, the plate-shaped rear surface 18*b* is shown.

According to one aspect, the braiding member 18 comprises a ring-shaped body 19 with an inner opening 19*a* that forms the inner braiding area 18*c*. Illustratively, the inner opening 19*a* exhibits a six-petalled Rosette shape, i.e., is formed with a six-petalled Rosette shaped circumference 19*b*.

More specifically, the inner opening 19*a* is preferably composed of a central opening 20 with a predetermined number of radial extensions. By way of example, six radial extensions 20*a*, 20*b*, 20*c*, 20*d*, 20*e*, 20*f* are illustrated.

In an exemplary realization, the ring-shaped body 19 further comprises a predetermined number of external recesses. By way of example, six external recesses 21*a*, 21*b*, 21*c*, 21*d*, 21*e*, 21*f* are provided. The external recesses 21*a*, 21*b*, 21*c*, 21*d*, 21*e*, 21*f* may be provided to enable a comfortable handling and grabbing of the ring-shaped body 19.

Preferably, the ring-shaped body 19 is further provided with two diametrically opposed through-holes 22. The through-holes 22 are preferentially adapted to receive a ladder step fixing element (28 in FIG. 8 to FIG. 10), such as a self-locking screw. Illustratively, one of the through-holes 22 comprises a bearing surface 22*a* that is e.g., adapted for bearing of an associated screw head.

Figure 4:
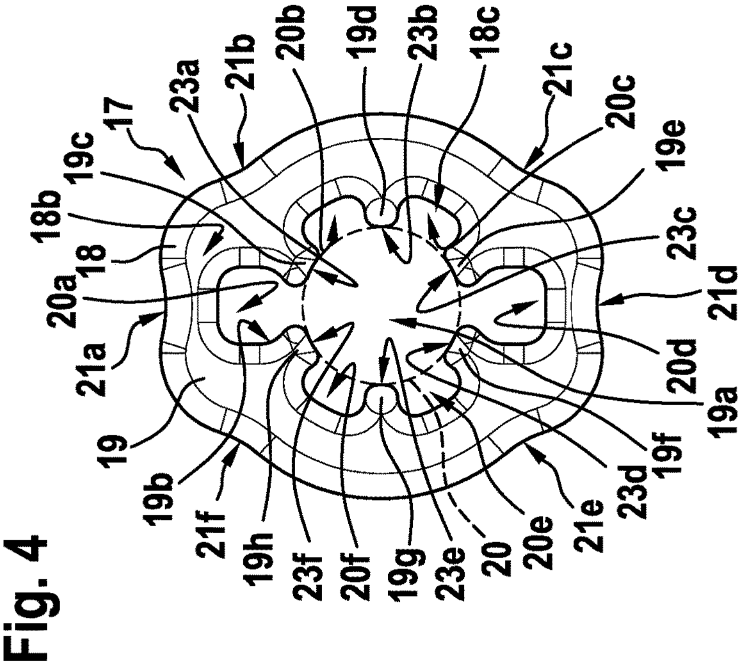
FIG. 4 shows a front view of the ladder step connecting element of FIG. 3.

FIG. 4 shows the ladder step connecting element 17, i.e., the braiding member 18 of FIG. 3, to further illustrate its plate-shaped rear surface 18*b*. According to FIG. 3, the braiding member 18 comprises the ring-shaped body 19 with the inner opening 19*a* that forms the inner braiding area 18*c* and that is composed of the central opening 20 and the six radial extensions 20*a*, 20*b*, 20*c*, 20*d*, 20*e*, 20*f*.

According to one aspect, the inner braiding area 18*c* is formed by means of a predetermined number of retaining fingers. By way of example, six retaining fingers 19*c*, 19*d*, 19*e*, 19*f*, 19*g*, 19*h* are provided. The retaining fingers 19*c*, 19*d*, 19*e*, 19*f*, 19*g*, 19*h* illustratively extend from the ring-shaped body 19 radially inward toward the central opening 20 and preferably separate the radial extensions 20*a*, 20*b*, 20*c*, 20*d*, 20*e*, 20*f* from each other.

Preferably, the retaining fingers 19*c*, 19*d*, 19*e*, 19*f*, 19*g*, 19*h* comprise free ends 23*a*, 23*b*, 23*c*, 23*d*, 23*e*, 23*f* which form bearing support surfaces for bearing of an associated ladder step, e.g., the ladder step 12*a* of FIG. 2. Therefore, the bearing support surfaces 23*a*, 23*b*, 23*c*, 23*d*, 23*e*, 23*f* preferentially define a diameter (26 in FIG. 7) of the central opening 20 that corresponds at least approximately to a diameter (12*b* in FIG. 8) of the ladder step.

Figure 5:
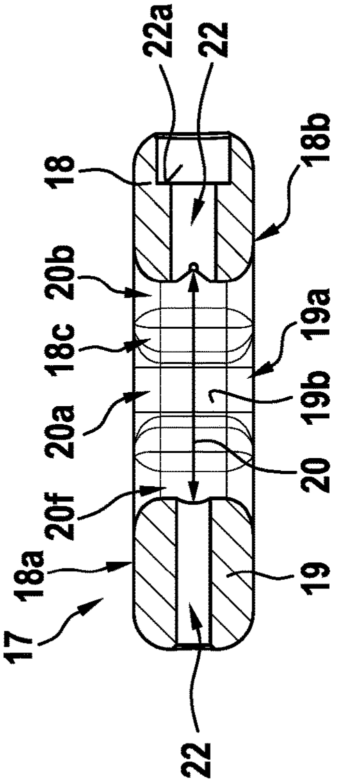
FIG. 5 shows a sectional view of the ladder step connecting element of FIG. 3 and FIG. 4, seen along section lines V-V of FIG. 3.

FIG. 5 shows the ladder step connecting element 17, i.e., the braiding member 18 of FIG. 3, to further illustrate the through-holes 22 and the bearing surface 22*a*. Furthermore, the central opening 20 is further illustrated by means of its maximum diameter.

Figure 6:
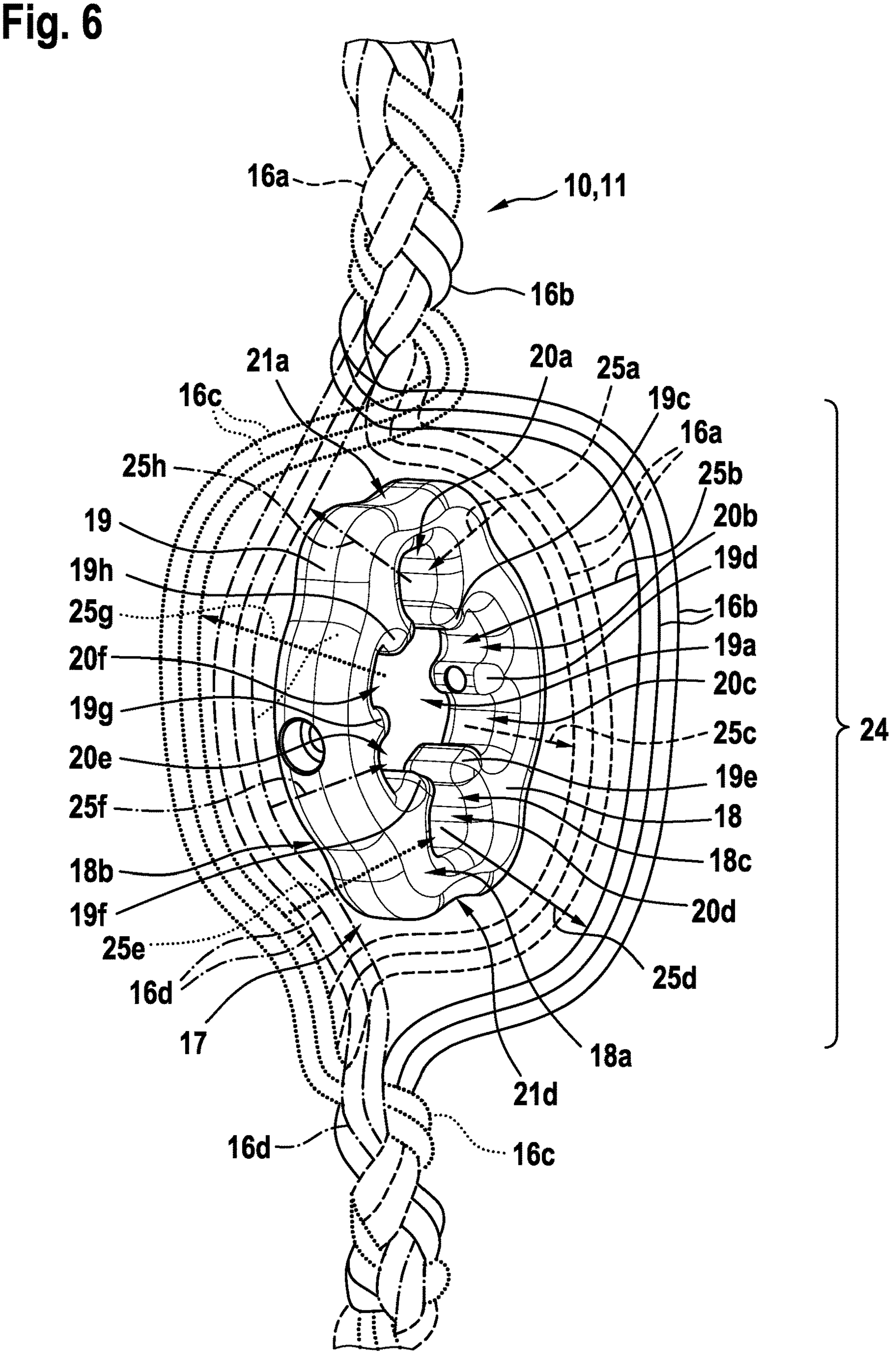
FIG. 6 shows a perspective view of a braided rope of the rope ladder of FIG. 2 prior to braiding the ladder step connecting element of FIG. 3 to FIG. 5 into the braided rope.
Figure 7:
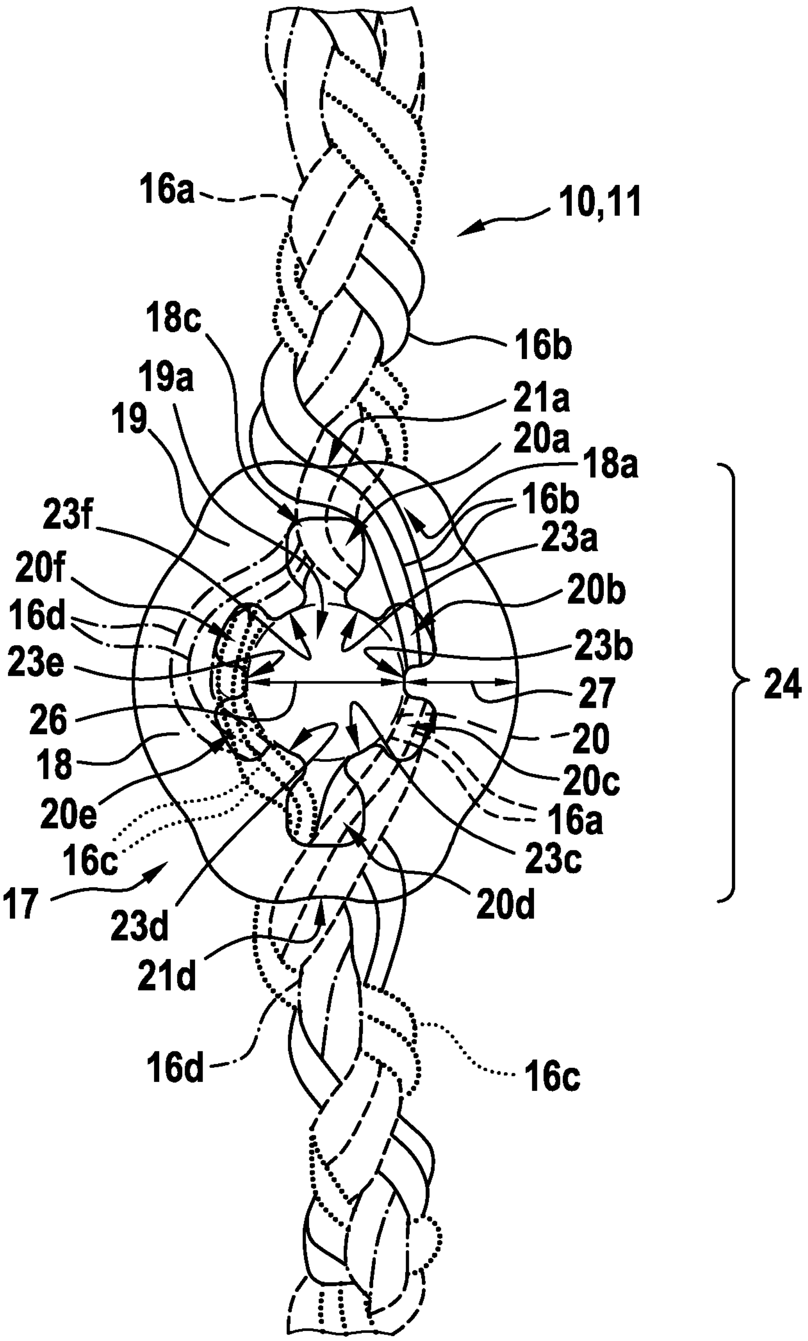
FIG. 7 shows a front view of the braided rope and the ladder step connecting element of FIG. 5 after the braiding.

FIG. 6 and FIG. 7 show an illustrative method of braiding the ladder step connecting elements 17, i.e., the braiding members 18 of FIG. 2 to FIG. 5 into the braided ropes 10, 11 of FIG. 2 in order to enable fixation of the ladder step 12*a* of FIG. 2 at the braiding members 18. Illustratively, each one of the braided ropes 10, 11 comprises the first, second, third, and fourth pair of strands 16*a*, 16*b*, 16*c*, 16*d* according to FIG. 2, and each one of the braiding members 18 comprises the ring-shaped body 19 with the plate-shaped front surface 18*a*, the plate-shaped rear surface 18*b*, and the inner braiding area 18*c* according to FIG. 3 to FIG. 5.

According to one aspect, the ring-shaped body 19 has a thickness 27 that corresponds at least to the average thickness of a human finger. Preferably, the thickness amounts at least to three centimeters. Thus, a comfortable grabbing of the ladder step 12*a* is enabled after assembling of the rope ladder 8 of FIG. 1 and FIG. 2.

By way of example, the illustrative method is described in detail hereinafter with reference to insertion of the braiding member 18 into the braided rope 10. Insertion of the braiding member 18 into the braided rope 11 is carried out similarly.

Initially, as shown in FIG. 6, the braided rope 10 is opened, i.e., pulled open, in an area 24 into which the braiding member 18 is to be inserted. According to one aspect, this is performed in a nondestructive manner by simply unbraiding, i.e., disentangling, the braided rope 10 in the area 24. The braiding member 18 is then positioned in the area 24 such that the first and second pairs of strands 16*a*, 16*b* are located at the plate-shaped front surface 18*a* of the braiding member 18, while the third and fourth pairs of strands 16*c*, 16*d* are located at the plate-shaped rear surface 18*b*.

Then, as illustrated with arrows 25*a*, 25*b*, a first number of strands, by way of example the pairs of strands 16*a*, 16*b*, is guided on the braiding member 18 from the plate-shaped front surface 18*a* toward the plate-shaped rear surface 18*b* and back to the plate-shaped front surface 18*a*, as illustrated with arrows 25*c*, 25*d*. Furthermore, as illustrated with arrows 25*e*, 25*f*, a second number of strands, by way of example the pairs of strands 16*c*, 16*d*, is guided on the braiding member 18 from the plate-shaped rear surface 18*b* toward the plate-shaped front surface 18*a* and back to the plate-shaped rear surface 18*b*, as illustrated with arrows 25*g*, 25*h*.

As a result, the pair of strands 16*a* is guided on the braiding member 18 from the plate-shaped front surface 18*a* through the radial extension 20*a* toward the plate-shaped rear surface 18*b* and through the radial extension 20*c* back to the plate-shaped front surface 18*a*. Thus, the pair of strands 16*a* is retained on the plate-shaped rear surface 18*b* by the retaining fingers 19*c*, 19*d*. The pair of strands 16*b* is guided on the braiding member 18 from the plate-shaped front surface 18*a* through the radial extension 20*b* toward the plate-shaped rear surface 18*b* and through the radial extension 20*d* back to the plate-shaped front surface 18*a*. Thus, the pair of strands 16*b* is retained on the plate-shaped rear surface 18*b* by the retaining fingers 19*d*, 19*e*. The pair of strands 16*c* is guided on the braiding member 18 from the plate-shaped rear surface 18*b* through the radial extension 20*d* toward the plate-shaped front surface 18*a* and through the radial extension 20*f* back to the plate-shaped rear surface 18*b*. Thus, the pair of strands 16*b* is retained on the plate-shaped front surface 18*a* by the retaining fingers 19*f*, 19*g*. The pair of strands 16*d* is guided on the braiding member 18 from the plate-shaped rear surface 18*b* through the radial extension 20*e* toward the plate-shaped front surface 18*a* and through the radial extension 20*a* back to the plate-shaped rear surface 18*b*. Thus, the pair of strands 16*d* is retained on the plate-shaped front surface 18*a* by the retaining fingers 19*g*, 19*h*.

Guidance of the pair of strands 16*a* through the radial extensions 20*a*, 20*c* is further illustrated in FIG. 7, as well as guidance of the pair of strands 16*b* through the radial extensions 20*b*, 20*d*, the pair of strands 16*c* through the radial extensions 20*d*, 20*f*, and the pair of strands 16*d* through the radial extensions 20*e*, 20*a*. As a result, the braided rope 10 is braided into the radial extensions 20*a*, 20*b*, 20*c*, 20*d*, 20*e*, 20*f* of the braiding member 18.

More specifically, the braided rope 10 is braided into the radial extensions 20*a*, 20*b*, 20*c*, 20*d*, 20*e*, 20*f* of the braiding member 18 as illustrated in FIG. 7 such that the pairs of strands 16*a*, 16*b*, 16*c*, 16*d* do not occupy the central opening 20 of FIG. 4, which illustratively comprises a diameter 26. According to one aspect, the diameter 26 of the central opening 20 is adapted to permit insertion of the ladder step 12*a* of FIG. 2 therethrough. More specifically, the ladder step 12*a* is preferably mountable to the central opening 20 such that the ladder step 12*a* blocks the braided ropes 10, 11 in the radial extensions 20*a*, 20*b*, 20*c*, 20*d*, 20*e*, 20*f*.

Figure 8:
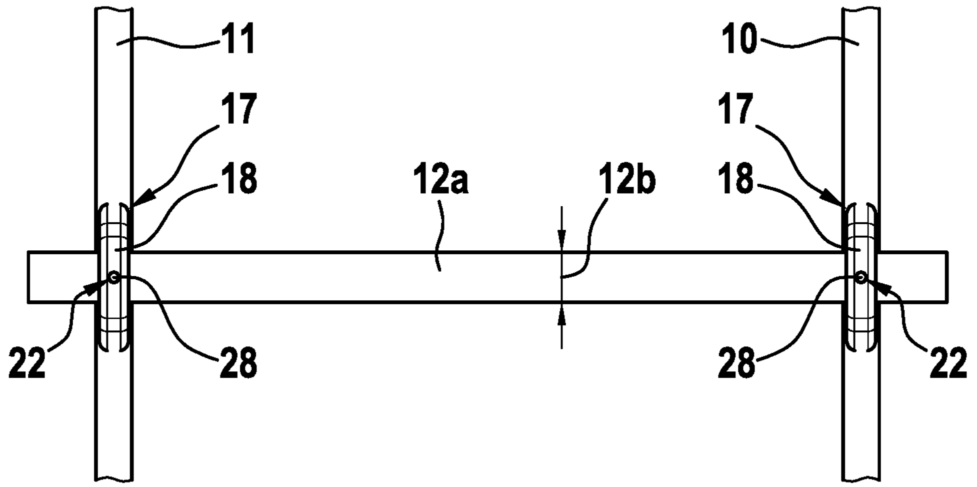
FIG. 8 shows a front view of an enlarged detail VIII of FIG. 2.

FIG. 8 shows the braided ropes 10, 11 with the ladder step connecting elements 17, i.e., the braiding members 18, braided thereinto according to FIG. 6 and FIG. 7. According to one aspect, and as described above at FIG. 2, the ladder step connecting element 17 in the braided rope 10 is now coupled via the ladder step 12*a* to the ladder step connecting element 17 in the braided rope 11.

Illustratively, the ladder step 12*a* has an outer diameter 12*b*. This outer diameter 12*b* is preferably at least approximately equal to, or smaller than, the diameter 26 of the central opening 20 of FIG. 7.

Furthermore, according to one aspect the ladder step 12*a* is fixedly mounted, respectively secured, to the ladder step connecting elements 17, i.e., the braiding members 18, via associated fixing elements 28. The fixing elements 28 are e.g., self-locking screws which are mounted to the through-holes 22 of the braiding members 18 and which preferably traverse the ladder step 12*a*.

Figure 9:
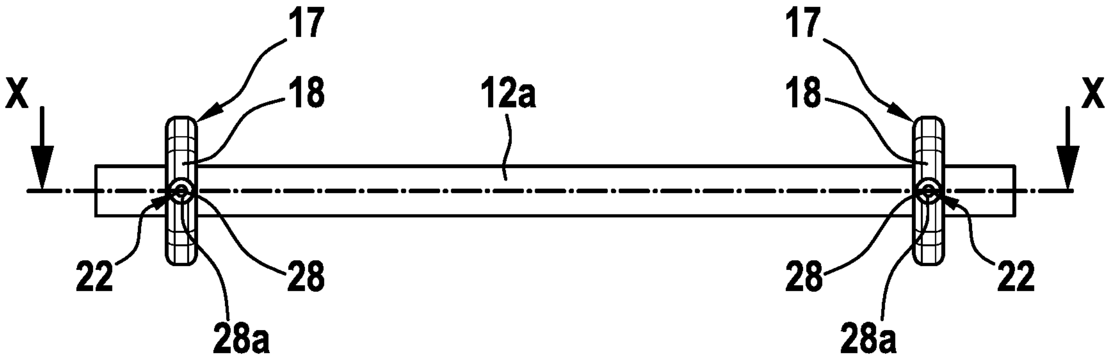
FIG. 9 shows two ladder step connecting elements and an associated ladder step according to FIG. 8.

FIG. 9 shows the ladder step 12*a* which is according to FIG. 8 fixedly mounted, respectively secured, to the ladder step connecting elements 17, i.e., the braiding members 18, via the fixing elements 28. The fixing elements 28 are, by way of example, embodied as self-locking screws which are mounted to the through-holes 22 of the braiding members 18 and which illustratively comprise respective screw heads 28*a*.

Figure 10:
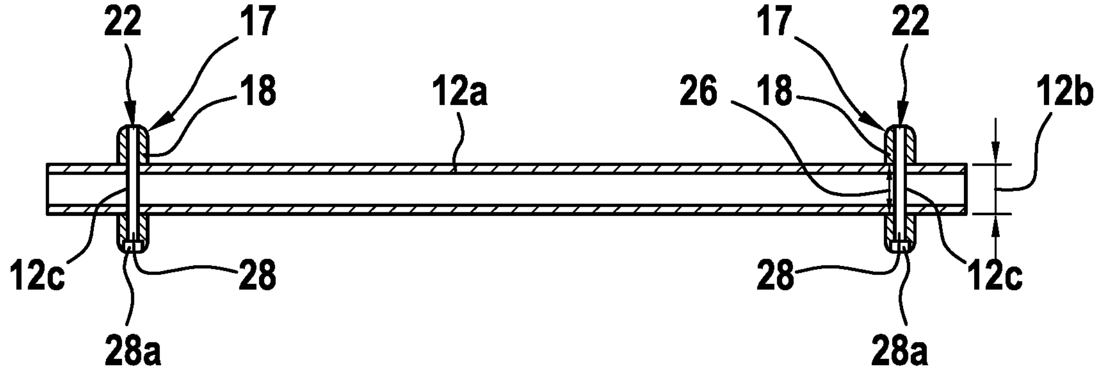
FIG. 10 shows a sectional view of the two ladder step connecting elements and the associated ladder step of FIG. 9, seen along section lines X-X of FIG. 9.

FIG. 10 shows the ladder step 12*a* which is according to FIG. 8 and FIG. 9 fixedly mounted, respectively secured, to the ladder step connecting elements 17, i.e., the braiding members 18, via the fixing elements 28. The fixing elements 28 are mounted to the through-holes 22 of the braiding members 18 and illustratively traverse the ladder step 12*a* through respective ladder step through-holes 12*c*.

FIG. 10 further illustrates the outer diameter 12*b* of the ladder step 12*a* according to FIG. 8, which is preferably at least approximately equal to, or smaller than, the diameter 26 of the central opening 20 of the braiding members 18 according to FIG. 7. Thus, the ladder step 12*a* may easily be mounted to the central openings 20 and by making the through-holes 22 of the braiding members 18 congruent with the ladder step through-holes 12*c*, insertion of the fixing elements 28 is enabled.

Figure 11:
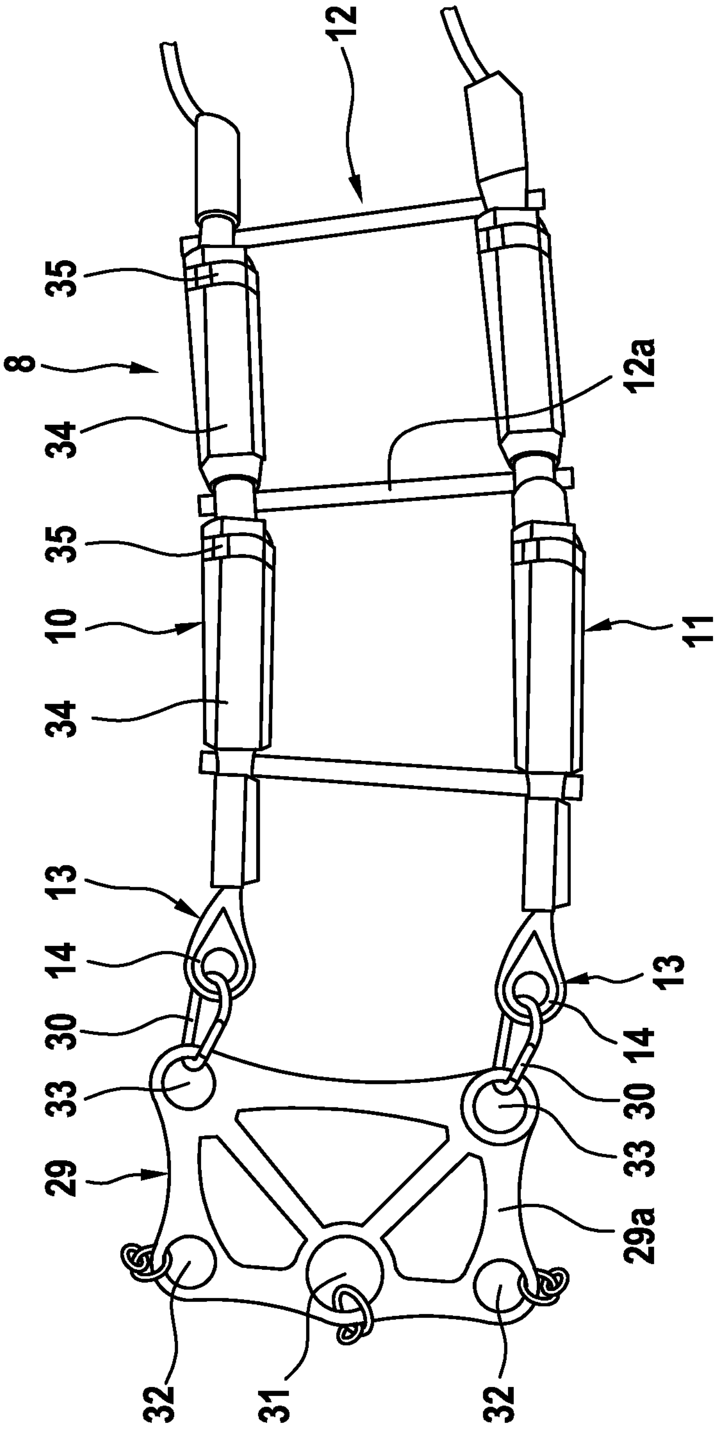
FIG. 11 shows a perspective view of the rope ladder of FIG. 1 and FIG. 2.

FIG. 11 shows the rope ladder 8 of FIG. 2 with the braided ropes 10, 11, and the plurality of ladder steps 12 that includes the ladder step 12*a*, as well as the rope interfaces 13 with the eyelets 14. The ladder step 12*a* and, more particularly, the plurality of ladder steps 12 is mounted to the braided ropes 10, 11 and, thus, the rope ladder 8 is assembled as described above with reference to FIG. 2 to FIG. 10.

According to one aspect, the braided ropes 10, 11 are at least partly provided with spacing and protecting elements 34. The spacing and protecting elements 34 preferably surround the braided ropes 10, 11, at least between adjacent ladder steps of the plurality of ladder steps 12.

In an exemplary realization, the spacing and protecting elements 34 are made of foam that is surrounded by a textile, both of which are wrapped around the braided ropes 10, and secured thereon. By way of example, the spacing and protecting elements 34 are secured on the braided ropes 10, 11 by means of any suitable fixations 35, such as e.g., Velcro fasteners.

The main function of the spacing and protecting elements 34 is to protect the braided ropes 10, 11 from abrasion, as well as to provide a distancing between the plurality of ladder steps 12 and e.g., an external support to which the rope ladder 8 is attached, for instance the rear ramp 2*f* of the rotary wing aircraft 1 of FIG. 1, in order to enable a more comfortable and safer grabbing of the ladder steps. Respective properties of the spacing and protecting elements 34, such as foam density, hardness, geometry, and surface texture, may be adapted in an application-specific manner, e.g., to enable use of the rope ladder 8 either as buoyancy or weight in fluids, abrasive protection, e.g., especially on edges of an external support to which the rope ladder 8 is attached, such as for instance the rear ramp 2*f* of the rotary wing aircraft 1 of FIG. 1, or adapting it to human needs, such as e.g., finger pinching protection or anti slipping means.

Attachment of the rope ladder 8 to an external support is preferably achieved by means of an attachment interface 29 to which the rope interfaces 13 are attached. By way of example, the attachment interface 29 comprises a predetermined number of interconnected arms which illustratively form an attachment plate 29*a*.

According to one aspect, the attachment plate 29*a* comprises an upper inner attachment point 31, which is illustratively formed as an upper center hole, and two upper outer attachment points 32, which are illustratively formed as upper side holes. The attachment plate 29*a* preferably further comprises two lower outer attachment points 33, which are illustratively formed as lower side holes. The lower side holes 33 may be attached to the rope interfaces 13 by any suitable attachment means, such as e.g., snap hooks respectively carabiners 30.

The upper center hole 31 and the upper side holes 32 may be used for a one-point attachment or a multiple-point attachment. A one-point attachment may for instance be used when the upper center hole 31 of the attachment plate 29*a* is e.g., attached by means of an associated snap hook respectively carabiner to a winch of the rotary wing aircraft 1 of FIG. 1, which may be located over the sliding door 2*g* of FIG. 1. A multi-point attachment may for instance be used when at least the two upper side holes 32 are e.g., attached by means of associated snap hooks respectively carabiners to the rear ramp 2*f* of the rotary wing aircraft 1, as illustrated in FIG. 1.

REFERENCE LIST

1 rotary wing aircraft
1*a* main rotor
2 fuselage
2*a* tail boom
2*b* cabin
2*c* rear fuselage
2*d* starboard side wall
2*e* bottom shell
2*f* rear ramp
2*g* starboard side sliding door
3 counter-torque device
4 tail wing
5 fin
6 wheel-type landing gear
6*a* wheel-type landing gear nose wheels
6*b* wheel-type landing gear portside rear wheel
6*c* wheel-type landing gear starboard side rear wheel
8 modular ladder
9 ground
10 first braided rope
11 second braided rope
12 plurality of ladder steps
12*a* ladder step
12*b* ladder step diameter
12*c* ladder step through-holes
13 rope interfaces
14 eyelets
15 splicing/inter-braiding
16 strands
16*a*, 16*b*, 16*c*, 16*d* pairs of strands
17 ladder step connecting element
18 braiding member
18*a* plate-shaped front surface
18*b* plate-shaped rear surface
18*c* inner braiding area
19 ring-shaped body
19*a* inner opening
19*b* six-petalled Rosette shaped circumference
19*c*, 19*d*, 19*e*, 19*f*, 19*g*, 19*h* retaining fingers
20 central opening
20*a*, 20*b*, 20*c*, 20*d*, 20*e*, 20*f* radial extensions
21*a*, 21*b*, 21*c*, 21*d*, 21*e*, 21*f* external recesses
22 through-holes
22*a* bearing surface

23a, 23b, 23c, 23d, 23e, 23f bearing support surfaces
24 ladder step insertion area
25a, 25b, 25c, 25d, 25e, 25f, 25g, 25h braiding directions
26 central opening diameter
27 ring-shaped body thickness
28 ladder step fixing element
28a screw heads
29 ladder attachment interface
29a attachment plate
30 snap hooks
31 upper inner attachment point
32 upper outer attachment points
33 lower outer attachment points
34 spacing and protecting elements
35 spacing and protecting element fixations

What is claimed is:

1. A rope ladder with a first braided rope, a second braided rope, and a plurality of ladder steps, comprising:

at least one first ladder step connecting element that is mounted to the first braided rope, at least one second ladder step connecting element that is mounted to the second braided rope, and at least one associated ladder step of the plurality of ladder steps that couples the at least one first ladder step connecting element with the at least one second ladder step connecting element;

wherein the at least one first ladder step connecting element is braided into the first braided rope and the at least one second ladder step connecting element is braided into the second braided rope, and wherein the at least one associated ladder step of the plurality of ladder steps fixes the at least one first ladder step connecting element in the first braided rope and the at least one second ladder step connecting element in the second braided rope.

2. The rope ladder of claim 1 wherein the at least one first ladder step connecting element is embodied as a first braiding member; and wherein the at least one second ladder step connecting element is embodied as a second braiding member.

3. The rope ladder of claim 2 wherein each one of the first braiding member and the second braiding member comprises a ring-shaped body with an inner opening.

4. The rope ladder of claim 3 wherein the inner opening exhibits at least a six-petalled Rosette shape.

5. The rope ladder of claim 3, wherein the inner opening is composed of a central opening with a predetermined number of radial extensions.

6. The rope ladder of claim 5 wherein the radial extensions of the predetermined number of radial extensions are separated from each other by associated retaining fingers which extend from the ring-shaped body radially inward toward the central opening.

7. The rope ladder of claim 6 wherein the associated retaining fingers comprise free ends which form bearing support surfaces that define a diameter of the central opening.

8. The rope ladder of claim 7 wherein the diameter of the central opening corresponds to a diameter of the at least one associated ladder step of the plurality of ladder steps.

9. The rope ladder of claim 5 wherein the first braided rope and the second braided rope are braided into the radial extensions of the predetermined number of radial extensions; and wherein the at least one associated ladder step of the plurality of ladder steps is mounted to the central opening such that the at least one associated ladder step blocks the first braided rope and the second braided rope in the radial extensions of the predetermined number of radial extensions.

10. The rope ladder of claim 3, wherein the ring-shaped body has a thickness of at least three centimeters.

11. The rope ladder of claim 1 wherein the first braided rope comprises a first predetermined number of strands which are braided together to form the first braided rope, the at least one first ladder step connecting element being braided into the first predetermined number of strands; and wherein the second braided rope comprises a second predetermined number of strands which are braided together to form the second braided rope, the at least one second ladder step connecting element being braided into the second predetermined number of strands.

12. The rope ladder of claim 11 wherein each one of the first braiding member and the second braiding member comprises a first plate-shaped surface and a second plate-shaped surface; wherein a first number of strands of the first predetermined number of strands is guided on the first braiding member from the first plate-shaped surface toward the second plate-shaped surface and back to the first plate-shaped surface, and a second number of strands of the first predetermined number of strands is guided on the first braiding member from the second plate-shaped surface toward the first plate-shaped surface and back to the second plate-shaped surface; and wherein a first number of strands of the second predetermined number of strands is guided on the second braiding member from the first plate-shaped surface toward the second plate-shaped surface and back to the first plate-shaped surface, and a second number of strands of the second predetermined number of strands is guided on the second braiding member from the second plate-shaped surface toward the first plate-shaped surface and back to the second plate-shaped surface.

13. The rope ladder of claim 1 wherein each one of the first braided rope and the second braided rope comprises a first, a second, a third, and a fourth pair of strands that are braided together; wherein the at least one first ladder step connecting element is braided into the first, second, third, and fourth pair of strands of the first braided rope; and wherein the at least one second ladder step connecting element is braided into the first, second, third, and fourth pair of strands of the second braided rope.

14. The rope ladder of claim 13 wherein each one of the first braiding member and the second braiding member comprises a first plate-shaped surface and a second plate-shaped surface; wherein the first and second pairs of strands of the first predetermined number of strands are guided on the first braiding member from the first plate-shaped surface toward the second plate-shaped surface and back to the first plate-shaped surface, and the third and fourth pairs of strands of the first predetermined number of strands are guided on the first braiding member from the second plate-shaped surface toward the first plate-shaped surface and back to the second plate-shaped surface; and wherein the third and fourth pairs of strands of the second predetermined number of strands are guided on the second braiding member from the first plate-shaped surface toward the second plate-shaped surface and back to the first plate-shaped surface, and the third and fourth pairs of strands of the second predetermined number of strands are guided on the second braiding member from the second plate-shaped surface toward the first plate-shaped surface and back to the second plate-shaped surface.

15. The rope ladder of claim 1 wherein the first and second braided ropes have a length, wherein the lengths of the first and second braided ropes are at least partly provided with associated spacing and protecting elements, wherein the associated spacing and protecting elements preferably surround the first and second braided ropes.

16. The rope ladder of claim 1 wherein each one of the first braided rope and the second braided rope are configured to widen respectively nondestructively at selected positions to allow insertion of the at least one first ladder step connecting element and the at least one second ladder step connecting element.

17. The rope ladder of claim 1 wherein the at least one first ladder step connecting element and the at least one second ladder step connecting element are formed from a metallic material.

18. The rope ladder of claim 1 wherein the at least one first ladder step connecting element and the at least one second ladder step connecting element further comprises a through-hole sized to receive a fastener consisting of one of two diameters, the larger of which is configured to form a bearing surface on which a head of a locking screw can rest.

19. A rope ladder comprising:

a first braided rope;

a second braided rope spaced from the first braided rope; and a plurality of ladder steps, at least one of the plurality of ladder steps comprising:

a first ladder step connecting element mounted to the first braided rope, a second ladder step connecting element mounted to the second braided rope, and an associated ladder step coupled to the first ladder step connecting element and the second ladder step connecting element;

wherein the first ladder step connecting element is braided into the first braided rope and the second ladder step connecting element is braided into the second braided rope, and wherein the associated ladder step of the plurality of ladder steps fixes the first ladder step connecting element in the first braided rope and the second ladder step connecting element in the second braided rope.

20. A rope ladder with a first braided rope, a second braided rope, and a plurality of ladder steps, comprising:

at least one first ladder step connector mounted to the first braided rope, at least one second ladder step connector mounted to the second braided rope, and at least one associated ladder step of the plurality of ladder steps that couples the at least one first ladder step connector with the at least one second ladder step connector;

wherein the first and second connectors both have radial extensions; and wherein the first braided rope is braided into the radial extensions of the first ladder step connector and the second braided rope is braided into the radial extensions of the second ladder step connector, and wherein the at least one associated ladder step of the plurality of ladder steps fixes the at least one first ladder step connector in the first braided rope and the at least one second ladder step connector in the second braided rope.

* * * * *